Feb. 23, 1943.                F. HUNZIKER                2,311,663
                              HOSE COUPLING
                   Original Filed Feb. 23, 1937    2 Sheets-Sheet 1
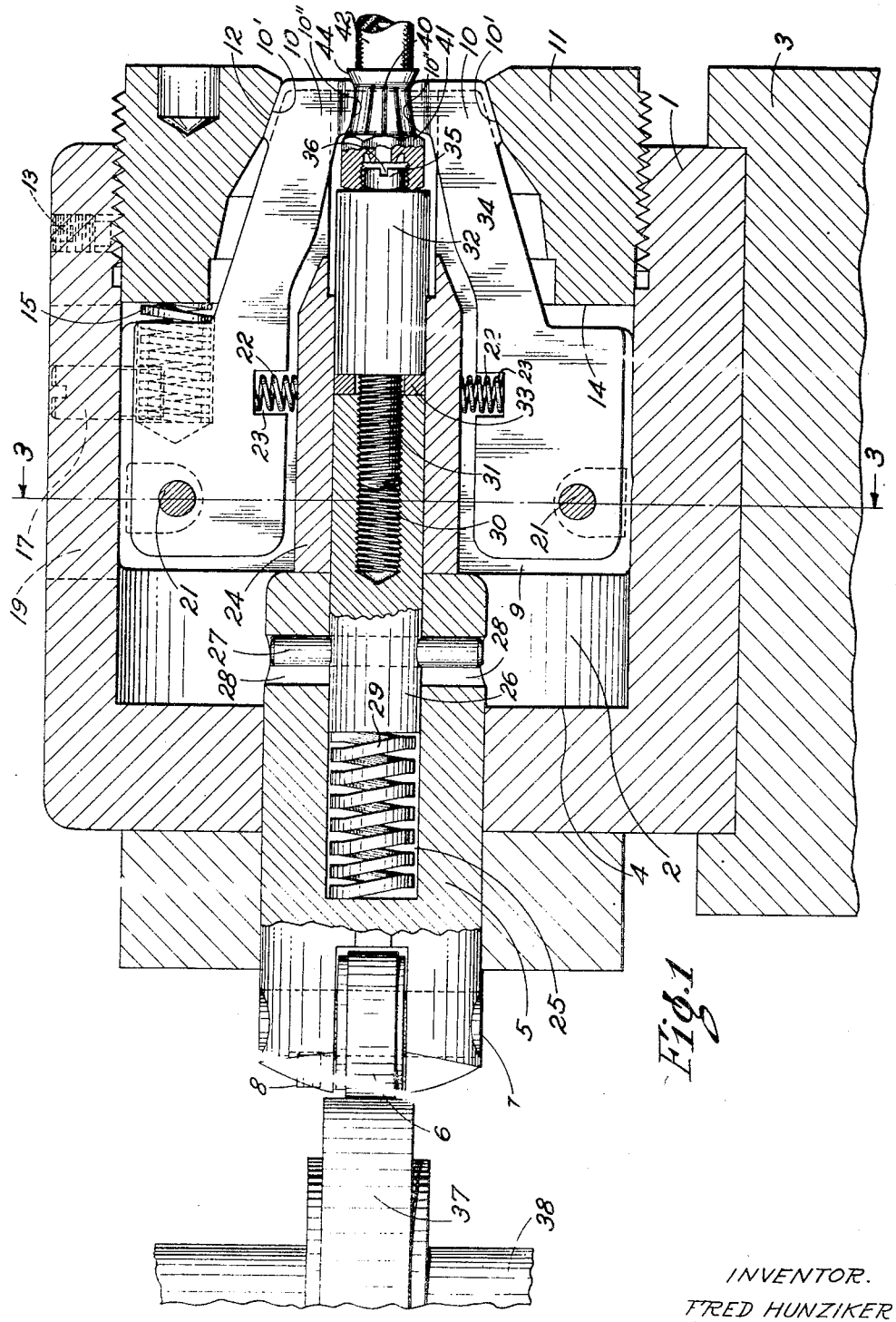
INVENTOR.
FRED HUNZIKER
BY Richey Watts
ATTORNEYS.

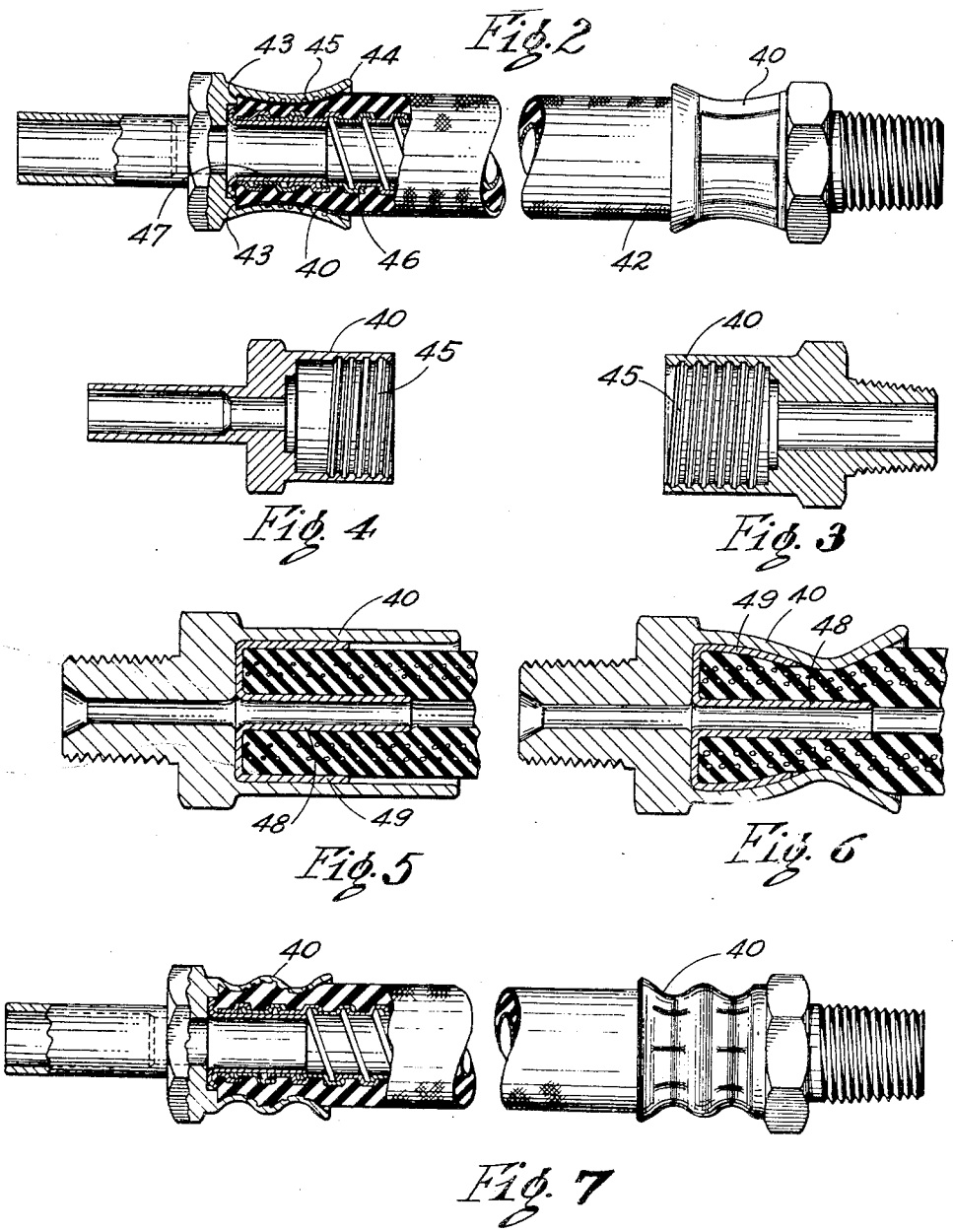

Patented Feb. 23, 1943

2,311,663

UNITED STATES PATENT OFFICE 2,311,663

HOSE COUPLING

Fred Hunziker, Cleveland, Ohio, assignor to The Weatherhead Company, Cleveland, Ohio, a corporation of Ohio Original application February 23, 1937, Serial No. 127,117, now Patent No. 2,211,622, dated August 13, 1940. Divided and this application February 16, 1940, Serial No. 319,297

2 Claims. (Cl. 285—84)

This invention relates to an improved article of manufacture and more particularly to certain improvements in flexible hose and fittings and assembled units of hose and fittings.

The present application is a division of my co-pending United States patent application Serial No. 127,117, filed February 23, 1937, now Patent No. 2,211,622. In the following specification my improved method and apparatus for manufacturing my hose and fitting assemblies is described in considerable detail in order that a full understanding may be had regarding a preferred method and apparatus for producing my improved article. Claims drawn to my improved apparatus remain in the said original application Serial No. 127,117 and claims drawn to the method of attaching the end fittings to the hose are contained in another divisional application Serial No. 304,359, filed November 14, 1939.

In attaching metal fittings to the ends of flexible hose such as is used for hydraulic brake fluid pressure conducting conduits and gasoline feed lines in automotive vehicles, it is of great importance to secure the fittings in an entirely leak-proof manner and so that the joint between the fitting and the hose will be at least as strong as the hose itself. Prior to the present invention fittings of the general type herein illustrated and described have been secured to the ends of flexible hose by slipping the end of the hose into a tubular sleeve portion of the coupling and then rolling down the tubular portion of the coupling so that it tightly grips the hose, compressing the resilient material of the hose and forcing the hose end into sealing engagement with a suitable shoulder at the inner end of the sleeve of the coupling. The metal used in the prior fittings as well as that used in the fittings of the present invention is necessarily ductile in nature, as distinguished from relatively brittle cast metal, so that it will withstand cold working during attachment to a hose.

It is among the objects of the present invention to provide an improved hose and fitting unit in which the original physical properties of the metal of the fitting are retained during and after the attachment of the coupling to the hose.

The above and other objects of my invention will appear from the following description of my improved article of manufacture and a machine which is adapted efficiently and economically to produce same, reference being had to the accompanying drawings, in which—

Figure 1 is a vertical section through one embodiment of my forming machine showing a fitting and hose end in position, the parts being shown in the positions they assume when the coupling or fitting has been fully crimped.

Figure 2 is a view of a gasoline hose having a metal lining and equipped with couplings secured in accordance with my method.

Figure 3 is a detached cross-sectional view of one of the couplings of Figure 2 before the crimping operation has taken place.

Figure 4 is a view similar to Figure 3 but illustrating the fitting shown on the left hand end of the hose in Figure 2.

Figure 5 is a fragmentary cross-sectional view of a high pressure hose and coupling before the crimping operation has taken place.

Figure 6 is a view of the hose end shown in Figure 5 after the tubular sleeve portion of the coupling has been deformed to secure it to the hose.

Figure 7 is a view generally similar to Figure 2 but illustrating a modified form of crimp in which a double bend is imparted to the tubular flange of the coupling.

Referring now to Figure 1, the shell or housing 1 is provided with a cylindrical bore 2. The housing 1 may be fixed to and supported in any suitable manner on the base 3. The end 4 of the housing 1 is bored to accommodate the plunger 5 which carries the cam follower 6 at one end. This roll 6 may be mounted to rotate on a shaft 7 which is secured in position by a set screw 8. The plunger 5 extends into the bore 2 of the housing 1 and abuts against the spider or frame 9 which carries the crimping, pressing or forming fingers 10. As is seen in Figures 2 and 3 the spider or frame 9 has a sliding fit in the cylindrical bore 2 of the housing 1. A threaded collet 11 is disposed at the opposite end of the cylindrical bore 2 and is provided with a tapered conical crimping finger engaging surface 12. This collet 11 may be screwed into the housing 1 a degree sufficient to give the desired deformation, as will be later explained, and a set screw 13 extends through the housing 1 and locks the collet 11 in the desired position. The inner face 14 of the collet 11 forms an abutment for the springs 15 (see Figs. 1 and 2) which are disposed in spaced holes 16 in the sliding frame or spider 9. These springs are under compression and exert a force tending to move the spider 9 toward the end wall 4 of the housing 1. A pin 17 is secured in a suitable aperture 18 (see Figs. 4 and 5) in the spider 9 and extends up into a slot 19 in the housing 1. This slot permits longitudinal movement of the pin 17 and the spider 9 and prevents rotation of the spider 8 in the housing 1.

The spider 9 is preferably provided with slots, equally spaced circumferentially of the spider and of suitable width to guide the crimping fingers 10. Each finger 10 is pivotally supported in the spider 9 by means of a pin 21. These pins 21 extend through suitable apertures in the spider 9 and provide centers about which each of the fingers 10 may swing. Springs 22 extend into the cut-out portions 23 of the fingers 10 and have their inner ends bearing against the central tubular hub portion 24 of the spider 9. These springs 22 tend to move the pressing or crimping ends of the fingers 10 radially outwardly about their pivot pins 21.

The plunger 5 is provided with a central bore 25 and a bar 26 has a sliding fit therein. The movement of the bar 26 is limited in an axial direction by means of a pin 27 which extends through the bar 26 and is disposed in a slotted aperture 28 in the plunger 5. This pin and slot arrangement also prevents rotation of the bar 26 relative to the plunger 5. A compression spring 29 is disposed between the bottom of the bore 25 and the end of the bar 26 and tends to hold the bar in the position shown in Figure 1 with the pin 27 against the right hand end of the slotted aperture 28. The right hand end of the bar 26 has a threaded aperture 30 to accommodate the threaded portion 31 of the adjustable stop member 32. A spacing washer 33 is disposed between the stop member 32 and the end of the bar 26 and by varying the thickness of the spacing washer 33 the position of the end 34 of the stop member 32 may be adjusted. In the apparatus illustrated the end of the stop member 32 is provided with a boss 35 which centers the fitting relative to the crimping fingers. If desired this boss 35 may be provided with a screw driver slot 36 to facilitate adjustment of the installation thereof, and it will be understood that the end of the stop 32 may be formed to accommodate different types of fittings.

In operation of the forming mechanism the plunger 5 is reciprocated by means of the cam 37 mounted on a shaft 38. When the plunger is moved to the right (Fig. 1) by the cam 37 it pushes the spider 9 to the right and compresses the four circumferentially spaced springs 15. As the cam 37 rotates the springs 15 will move the spider 9 and the plunger 5 to the left. This reciprocating motion of the plunger 5 and the spider 9 will cause the fingers 10, and particularly the tapered faces 10' thereof, to slide on the tapered surface 12 of the collet member 11. In the position of the parts illustrated in Figure 1 the plunger 5, the spider 9, and the fingers 10 are in their farthest right or crimping positions and the crimping faces 10" of the fingers have engaged and deformed the tubular sleeve portion 40 of the coupling. As the operating cycle proceeds and the cam 37 continues to rotate, the spider 9 and the fingers 10 move to the left from the position shown in Figure 1, due to the action of the springs 15, and the springs 22 cause the fingers 10 to spread apart, the faces 10' of the fingers stay in contact with the surface 12 of the collet 11 and the pressing or crimping faces 10" open. When the spider 9 reaches the end of its return or releasing stroke the fingers 10 will be spread apart sufficiently to permit the free withdrawal of the coupling 41 from within the separated crimping faces 10" and the insertion of another coupling therein.

The crimping movement of the fingers 10 is substantially radially inwardly of the tubular flange 40 of the fitting. When the fingers reach their innermost position each finger is substantially in contact with its adjacent finger and substantially the entire circumference of the sleeve of the coupling is engaged thereby. A steady uniform pressure is applied throughout the engaged surface of the coupling and, due to the contour of the crimping faces of the fingers 10, the substantially radially inward movement thereof tends to cause the end of the hose 42 to be forced with great pressure against its seat 43 in the coupling (see Fig. 2). The inward bending of the sleeve 40 by the fingers 10 also causes the lip or end 44 of the sleeve 40 to flare outwardly, as is clearly shown in Figures 1 and 2, so that the diameter of the lip 44, after the forming operation, is larger than it was prior thereto. As is best seen in Figure 2 this flaring of the edge of the lip or sleeve 40 relieves the pressure of the sleeve against the hose 42 and provides a connection which will permit flexing or bending of the hose without wearing or cutting thereof.

In Figure 2 I have illustrated a hose provided with two different types of couplings, neither of which is the same as that illustrated in Figure 1. However, the difference between the various couplings illustrated lies primarily in the attachment end. They are all provided with a cylindrical sleeve portion 40 which fits over the end of the hose and which is crimped inwardly by the crimping fingers 10 to cause secure grip on the hose and also to force the inner end of the hose into fluid tight contact with the shoulder in the coupling.

As is seen in Figures 3 and 4, which illustrate the couplings of Figure 2 prior to their being attached to the hose, the sleeve ends 40 are preferably provided with coarse internal threads 45, preferably with rounded or flat root sections, which grip the hose surface. The particular hose illustrated in Figure 2 is of the metal lined type provided with a flexible metal lining 46. With this type hose a sleeve member 47 is preferably inserted in the end thereof to form a better joint between the end of the hose and the coupling, to prevent leakage therebetween and to support the metal lining against collapse.

In Figures 5 and 6 the type of coupling which is used for high pressure hydraulic brake hose is illustrated. This type of hose is not lined and in order to prevent collapse of the opening through the hose during the crimping operation a tubular member 48 is employed which extends into the hose and is provided with a cup-shaped portion 49 which fits within the sleeve 40. As is seen in Figure 6, the same flaring of the open end of the sleeve 40 occurs with this embodiment of my improved coupling as that previously described and thus cutting of the hose adjacent the coupling is prevented.

In Figure 7 a modified form of coupling attachment is illustrated in which the crimping dies are so formed as to bend the metal of the sleeve 40 inwardly at a plurality of places. This embodiment may be advantageously used in a variety of forming shapes with some types of hose and fittings and to perform various other forming, stamping or marking operations.

From the above description it will be seen that my hose and coupling units have properties not found in articles made by previously employed processes. In my improved hose and coupling assembly the metal of the sleeve or flange of the coupling which engages the hose has substantially the same physical properties as the parent metal from which the couplings are made. In articles of this class extruded brass rod is commonly used and the parts are formed on automatic machines. The metallurgical structure of extruded rod is particularly suited for the service in which these parts operate and by providing a coupling assembly in which all parts of the coupling retain substantially the original physical characteristics of the extruded rod the strength of the parts is greatly increased over the previously used couplings in which the metal of the coupling was subjected to violent kneading and cold working during the rolling or swaging operation performed thereon to attach it to the hose. Moreover, in previous procedures, it has been necessary to anneal the fittings before attaching to the hose and, as such annealing necessarily involved the entire fitting, the physical characteristics of the body of the fitting were detrimentally changed. Annealing also required an acid cleaning step which was expensive and in some instances, as noted before, actually harmful to threaded parts.

Although I have described my improved hose and fitting assembly in considerable detail, it will be understood by those skilled in the art that variations and modifications may be made without departing from the spirit of my invention. I do not, therefore, wish to be limited to the specific forms illustrated and described herein, but claim as my invention all embodiments thereof coming within the scope of the appended claims.

I claim:

1. A hose and fitting assembly comprising a hose of resilient material and a fitting of ductile metal as distinguished from brittle cast metal secured to an end thereof, said fitting including an open ended tubular sleeve portion enclosing a portion of said hose, said sleeve portion being substantially circular in cross-section and having a portion of smaller diameter than the normal hose diameter, the open end of said sleeve portion flaring outwardly so that its inside diameter at the end is greater than the normal outside diameter of the hose, said portion of said sleeve of smaller diameter having a plurality of circumferentially spaced ribs extending out from the surface of the sleeve a distance less than the wall thickness of said tubular sleeve portion, and the metal of said portion of said sleeve of smaller diameter having substantially the same physical characteristics as the metal of the body of the fitting.

2. A hose and fitting assembly comprising a hose of resilient material and a fitting of ductile metal secured to an end thereof, said fitting including an open ended tubular sleeve portion enclosing a portion of said hose, said sleeve portion having a portion of smaller cross-sectional area than the normal hose cross-sectional area, said portion of said sleeve of smaller cross-sectional area having a plurality of circumferentially spaced ribs extending out from the surface of the sleeve a distance less than the wall thickness of said tubular sleeve portion, and the metal of said portion of said sleeve of smaller cross-sectional area having substantially the same physical characteristics as the metal of the body of the fitting.

FRED HUNZIKER.